United States Patent [19]

Weber et al.

[11] Patent Number: 4,844,413
[45] Date of Patent: Jul. 4, 1989

[54] SHUT-OFF/EQUALIZING VALVE WITH MOLDED SEALS

[75] Inventors: Lee A. Weber, Mentor; Frank Machesky, Spencer, both of Ohio

[73] Assignee: The Babcock & Wilcox Company, New Orleans, La.

[21] Appl. No.: 642,285

[22] Filed: Aug. 20, 1984

[51] Int. Cl.$^4$ .............................................. F16K 5/04
[52] U.S. Cl. .................................................. 251/314
[58] Field of Search ...................... 251/314, 315, 359; 137/375

[56] References Cited

U.S. PATENT DOCUMENTS

| | | | |
|---|---|---|---|
| 3,227,174 | 1/1966 | Yost | 251/315 |
| 3,244,398 | 4/1966 | Scaramucci | 251/315 |
| 3,450,151 | 6/1969 | Heutzenroeder | 251/315 |
| 3,501,128 | 3/1970 | Pool | 251/315 |
| 3,521,855 | 7/1970 | Jensen | 251/315 |
| 3,545,721 | 12/1970 | Shafer | 251/315 |
| 3,575,379 | 4/1971 | Hoos | 251/314 |
| 3,729,170 | 4/1973 | Lewis et al. | 251/315 |
| 3,771,545 | 11/1973 | Allen | 251/315 |
| 4,103,867 | 8/1978 | Orr | 251/315 |
| 4,206,904 | 6/1980 | Dante | 251/315 |
| 4,494,730 | 1/1985 | George | 251/314 |

FOREIGN PATENT DOCUMENTS 2276523  1/1976  France ................. 251/314

*Primary Examiner*—Martin P. Schwadron
*Attorney, Agent, or Firm*—Vytas R. Matas; Robert J. Edwards

[57] ABSTRACT

A shut-off/equalizing valve in which a valve core assembly includes an elastomeric seal element molded onto a cylindrical metallic core member. The core member includes an enlarged barrel portion having a cross bore formed therethrough. The seal element is molded onto the barrel portion and includes first and second circumferential ribs adjacent the ends of the barrel portion, one of which lies adjacent to the openings of the cross bore, and pairs of longitudinal ribs in straddling relation to the openings of said cross bore.

1 Claim, 2 Drawing Sheets

SHUT-OFF/EQUALIZING VALVE WITH MOLDED SEALS

TECHNICAL FIELD

The present invention relates to air valves, and more particularly to an improved seal configuration for a shut-off/equalizing valve for a positioner system.

BACKGROUND ART

The shut-off/equalizing valve of the present invention is used in a system for positioning large devices such as air registers of the type used in boilers to change the amount of combustion air. In an "automatic" position the shut-off/equalizing valve allows air to flow unrestricted to the positioner. In the event that the device which the positioner is controlling must be operated manually, the shut-off/equalizing valve can be placed in a "manual" position. In this position the supply air to the positioner is shut off and the positioner's two outputs are connected together. This unloads the device controlled by the positioner so that it can be manually adjusted.

The prior art construction of the shut-off/equalizing valve includes multiple parts, requiring bonding a two-piece valve core together, installing replaceable O-rings, and requires custom assembly in the form of shimming to assure the correct compression of the O-rings. Surface finish in O-ring seal cavities and on other moving parts requires secondary machining operations in order to avoid premature wear. Also, O-rings are subject to rolling and twisting within their cavities, which also can produce premature wear.

SUMMARY OF THE INVENTION

The shut-off/equalizing valve of the present invention incorporates a turned aluminum core onto which an elastomer is molded. In a preferred embodiment an elastomer sold under the trademark "Viton" is used because of its resistance to the abrasion and chemicals to which the valve is likely to be subjected.

In a valve incorporating a core made in accordance with the present invention all sealing is radial; therefore a single secondary machining operation can control the compression of the sealing surfaces by controlling the valve body bore dimension.

The aluminum core is a fairly simple machined part having a stem portion and a enlarged barrel portion having a cross bore formed therethrough. The elastomeric sealing element is molded to the barrel, and includes a pair of spaced apart circumferential ribs one of which lies adjacent to the openings of said cross bore, and a plurality of longitudinal ribs connecting the circumferential ribs.

DESCRIPTION OF THE PREFERRED EMBODIMENT

Figure 1:
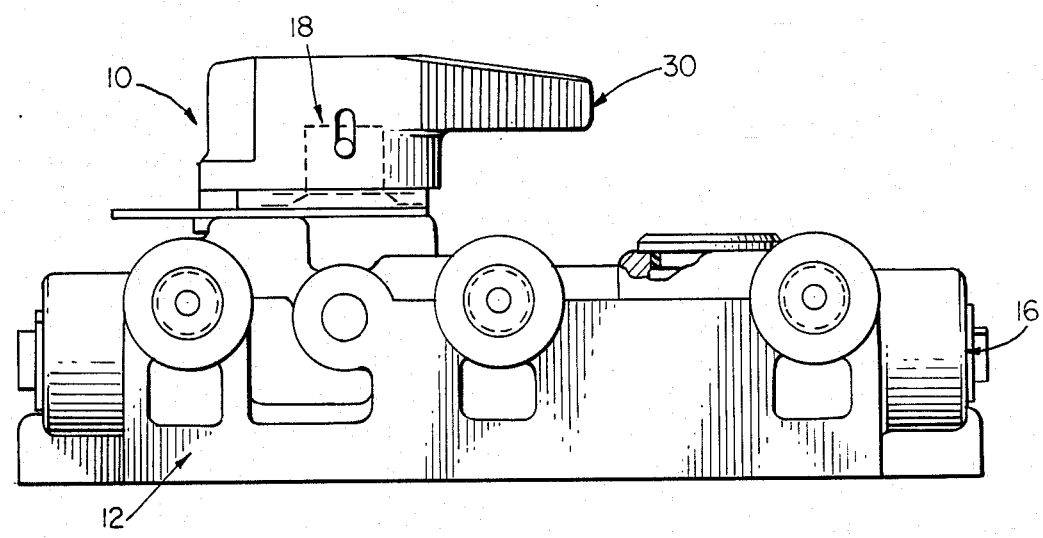
FIG. 1 is a side elevation view of a shut-off/equalizing valve incorporating a valve core in accordance with the invention.
Figure 1A:
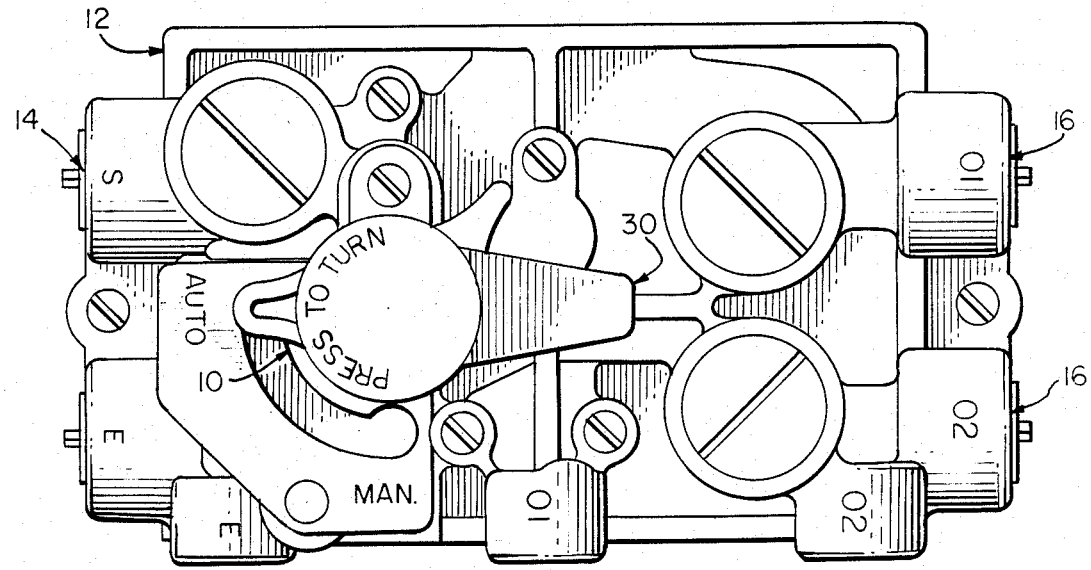

Referring to the drawings, in which like reference characters designate like or corresponding parts throughout the several views, there is illustrated a shut-off/equalizing valve designated generally by the numeral 10, comprising a body 12, an inlet connection 14, an outlet connection 16, and a valve core assembly 18.

Figure 2:
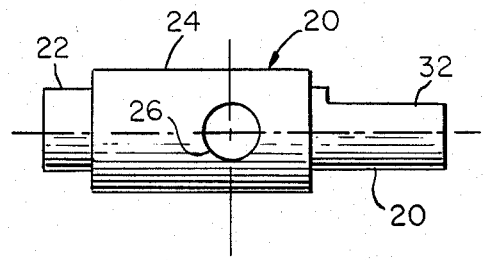
FIG. 2 is a side elevation view of a valve core prior to having the elastomeric seal element of the invention molded thereto.
Figure 3:
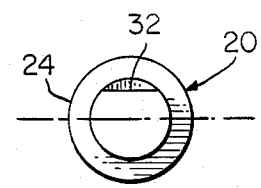
FIG. 3 is an end elevation view of the valve core of FIG. 2.

Referring to FIGS. 2 and 3, the core assembly 18 comprises a metallic core member 20, shown after machining but before application of the seal element of the invention. The core member 20 includes a shaft element 22 which is adapted to be received in a bore (not shown) in the valve body, and serves to position the core within the body; an enlarged barrel portion 24 having a cross bore 26 formed therethrough, and a stem portion 28 which extends upward through the body for the attachment of an actuating handle 30. (See FIG. 1) The stem element has a flat 32 formed thereon for proper positioning of the handle.

Figure 4:
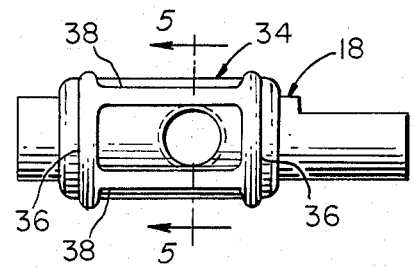
FIG. 4 is a side elevation view of the valve core of FIG. 2 after the elastomeric seal has been molded thereon.
Figure 5:
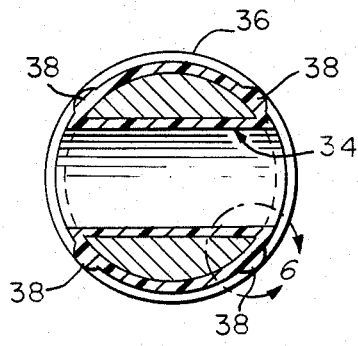
FIG. 5 is a sectional view taken along line 5—5 of FIG. 4.
Figure 6:
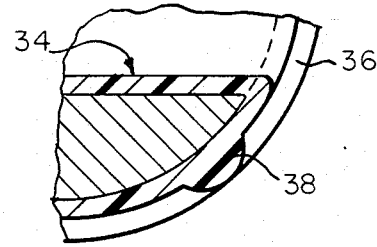
FIG. 6 is an enlarged sectional view showing the circled area of FIG. 5.

Referring to FIGS. 4 through 6, in accordance with the invention, an elastomeric seal element 34 is molded onto the barrel portion 24, with the elastomer covering the entire circumference of the barrel portion as well as the interior of the cross bore 26. The seal element is formed with first and second circumferential ribs 36 adjacent the ends of the barrel portion, one of which lies adjacent to the openings of said cross bore 26, and four longitudinal ribs 38. As shown in FIGS. 4 and 5, the longitudinal ribs 38 straddle the cross bore 26 so that in combination with the circumferential ribs 36, the cross bore is surrounded by compressible sealing ribs, insuring that there will be no leakage around the valve core when the cross bore is aligned with the inlet and outlet connections, and will completely seal off all flow through the valve when the cross bore is rotated 90° with respect to the inlet and outlet connections.

Certain modifications and improvements will occur to those skilled in the art upon reading the foregoing description. It will be understood that all such improvements and modifications have been deleted herein for the sake of conciseness and readability, but are properly within the scope of the following claims.

We claim:

1. In a shut-off/equalizing valve having a body and a core assembly rotatably received within said body, the improvement in which said rotatable core assembly comprises:

a cylindrical metallic core member having an enlarged barrel portion, a cross bore formed therethrough and a shaft element for positioning said core member within said body; and an elastomeric seal element molded onto said core member, said seal element including a layer of elastomeric material covering the circumference of a portion of said core member and the interior of said cross bore, first and second circumferential sealing ribs adjacent the ends of said barrel portion encompassing the openings of said cross bore, one of which lies adjacent to the openings of said cross bore, and at least two pairs of longitudinal sealing ribs extending between said circumferential ribs, each pair being in straddling relation to the openings of said cross bore, to surround the cross bore by compressible sealing ribs.

* * * * *